United States Patent
Yang et al.

(10) Patent No.: US 11,748,278 B2
(45) Date of Patent: Sep. 5, 2023

(54) MULTI-PROTOCOL SUPPORT FOR TRANSACTIONS

(71) Applicant: Intel Corporation, Santa Clara, CA (US)

(72) Inventors: Ziye Yang, Shanghai (CN); Changpeng Liu, Shanghai (CN); Gang Cao, Shanghai (CN); Qun Wan, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 357 days.

(21) Appl. No.: 16/827,460

(22) Filed: Mar. 23, 2020

(65) Prior Publication Data

US 2020/0293465 A1 Sep. 17, 2020

Related U.S. Application Data

(60) Provisional application No. 62/864,252, filed on Jun. 20, 2019.

(51) Int. Cl.
G06F 13/16 (2006.01)
G06F 12/10 (2016.01)

(52) U.S. Cl.
CPC .......... *G06F 13/1668* (2013.01); *G06F 12/10* (2013.01)

(58) Field of Classification Search
None
See application file for complete search history.

(56) References Cited

U.S. PATENT DOCUMENTS

| 10,178,035 B2* | 1/2019 | Dillon | H04L 43/0888 |
| 2006/0187960 A1* | 8/2006 | Murakami | H04L 69/18 370/469 |
| 2009/0063665 A1* | 3/2009 | Bagepalli | H04L 63/0428 710/100 |
| 2013/0198400 A1 | 8/2013 | Bhogal et al. | |

(Continued)

FOREIGN PATENT DOCUMENTS

WO 2005091141 A1 9/2005

OTHER PUBLICATIONS

A. Motakis, A. Rigo and D. Raho, "Platform Device Assignment to KVM-on-ARM Virtual Machines via VFIO," 2014 12th IEEE International Conference on Embedded and Ubiquitous Computing, Milano, 2014, pp. 170-177.

(Continued)

*Primary Examiner* — Michael Sun
(74) *Attorney, Agent, or Firm* — Compass IP Law PC

(57) ABSTRACT

Examples described herein relate to executing a poller to poll for received communications over multiple transport layer protocols from a connection to identify a received communication from one of the multiple transport layer protocols and identify a second received communication from a different one of the multiple transport layer protocols. A change to the different one of the multiple transport layer protocols occurs in response to failure of the one of the multiple transport layer protocols or slow transport rate using the one of the multiple transport layer protocols. In some examples, the poller is executed in user space and transport layer protocol processing of the received communication and second received communication occur in kernel space.

21 Claims, 10 Drawing Sheets

(56) References Cited

U.S. PATENT DOCUMENTS

2015/0254088 A1* 9/2015 Chou ............... H04L 67/1097
 718/1
2020/0314181 A1* 10/2020 Eran ..................... H04L 67/10

OTHER PUBLICATIONS

Extended European Search Report for Patent Application No. 20166065.1, dated Oct. 26, 2020, 12 pages.

Z. Yang et al., "SPDK: A Development Kit to Build High Performance Storage Applications," 2017 IEEE International Conference on Cloud Computing Technology and Science (CloudCom), Hong Kong, 2017, pp. 154-161.

* cited by examiner

MULTI-PROTOCOL SUPPORT FOR TRANSACTIONS

RELATED APPLICATION

The present application claims the benefit of a priority date of U.S. provisional patent application Ser. No. 62/864,252, filed Jun. 20, 2019, the entire disclosure of which is incorporated herein by reference.

DESCRIPTION

Various storage protocols exist that enable access to storage devices using a network or fabric. For example, the NVMe over Fabrics (NVMe-oF) specification is designed to enable access to remote NVMe compatible solid state drives (SSDs). For example, NVMe-oF is described at least in NVM Express Base Specification Revision 1.4 (2019). NVMe-oF compatible devices provide high performance NVMe storage drives to remote systems accessible over a network or fabric.

DETAILED DESCRIPTION

The Non-Volatile Memory Express (NVMe) Specification describes a system for accesses to data storage systems through a Peripheral Component Interconnect Express (PCIe) port. NVMe is described for example, in NVM Express™ Base Specification, Revision 1.3c (2018), as well as predecessors, successors, and proprietary variations thereof, which are incorporated by reference in their entirety. NVMe allows a host device to specify regions of storage as separate namespaces. A namespace can be an addressable domain in a non-volatile memory having a selected number of storage blocks that have been formatted for block access. A namespace can include an addressable portion of a media in a solid state drive (SSD), or a multi-device memory space that spans multiple SSDs or other data storage devices. A namespace ID (NSID) can be a unique identifier for an associated namespace. A host device can access a particular non-volatile memory by specifying an NSID, a controller ID and an associated logical address for the block or blocks (e.g., logical block addresses (LBAs)).

Distributed block storage systems provide block device functionality to applications by presenting logical block devices that are stored in segments potentially scattered across a large pool of remote storage devices. To use these logical block devices, applications determine the location of all the segments to access. A computing platform can access a storage device using a fabric or network. Example schemes for accessing storage using a fabric or network include NVMe-oF or other proprietary storage over fabrics or network specifications.

Figure 1:
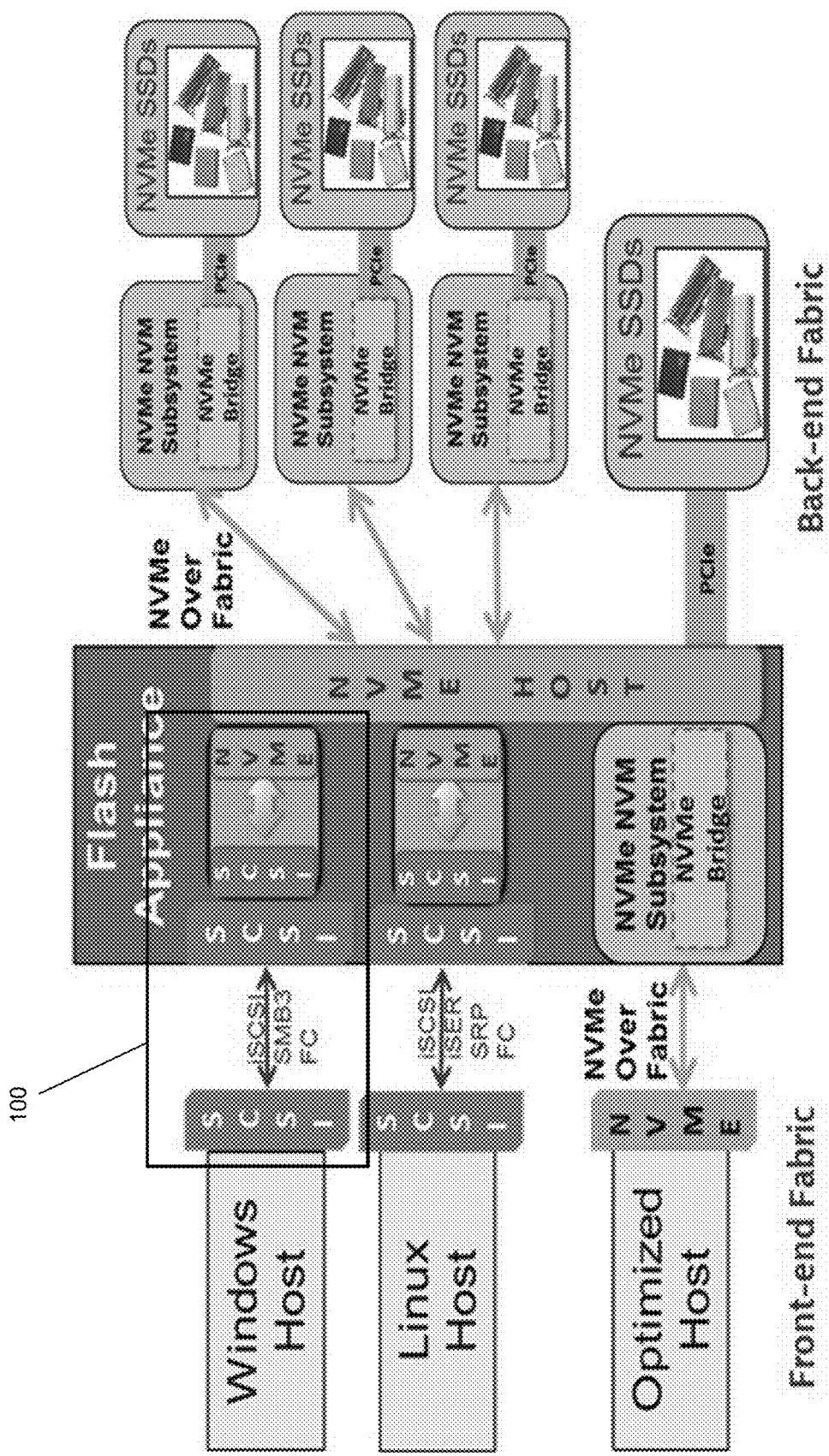
FIG. 1 depicts an example of a system that is NVMe-oF and Internet Small Computer Systems Interface (iSCSI) protocol compatible.

FIG. 1 depicts an example of a system that is NVMe-oF and Internet Small Computer Systems Interface (iSCSI) protocol compatible. With the emergence of NVMe compatible solid state drives (SSDs), re-use of the existing iSCSI protocol to allow access to SSDs to remote host devices can involve protocol conversions 100 (e.g., NVMe-to-SCSI-to-iSCSI and iSCSI-to-SCSI-to-NVMe). The NVMe-oF protocol can mitigate such issue by providing various transport layers for NVMe transactions such as remote direct memory access (RDMA), Fibre Channel (FC), and recently, Transmission Control Protocol (TCP).

In 2018, a specification involving TCP transport (e.g., TP-8000 NVMe-oF™ TCP Transport Binding) was released for NVMe-oF. The purpose of T-8000 is to re-use existing networking infrastructure because legacy network interface controllers (NICs) and switches may not support remote direct memory access (RDMA) related protocols. With TCP transport support, re-use of existing network infrastructures can take place to ease the transition from iSCSI to NVMe-oF. Accordingly, there are several well-known transport layer protocols (e.g., RDMA, FC, and TCP) defined and supported by NVMe-oF. Developers can implement NVMe-oF target or initiator using one or more different transports according to the specification to present an NVMe subsystem to remote hosts (initiators).

Generally, a single NVMe-oF service can be provided via different transports to avoid a single transport protocol layer failure disabling an NVMe-oF service. In other words, service reliability can be improved by providing a single NVMe-oF service via different transports because if one transport does not work, the NVMe-oF service can be provided through another transport. However, different fabrics transport provides different performances. For example, the RDMA transport can provide much faster transport speed than can TCP transport. Yet storage transactions are subject to service level agreements (SLAs) and are to be completed within a prescribed amount of time.

Some solutions for managing selection of transports are provided by a kernel. For example, a Linux operating system kernel can provide Linux I/O target (LIO) service to export an NVMe-oF service via different transports. Currently, Linux kernel mode supports RDMA and TCP over NVMe-oF. For example, if the kernel is enabled with nvmet_rdma and nvmet_tcp, then both RDMA transport and TCP transport can be used for NVMe-oF services.

Providing reliable service via multiple transports based on the kernel's solution can be challenging. If transport relies on the kernel module and the kernel crashes, there may be a delay in service resuming even if the service is deployed in virtual machines. In addition, if TCP or RDMA transport implementation in the kernel is not stable, the kernel can malfunction and can affect entire operating system (OS).

At a target device, execution of an NVMe-oF command can include:

1. Receive the NVMe-oF command extracted from the transport layer based request. A transport layer can be Layer 4 of the Open Systems Interconnection (OSI) communications model. A transport layer can be used to ensure reliable arrival of messages across a network and provide error-checking mechanisms and data flow controls.

2. Parse the command. If the command is an NVMe command, send the command to an underlying NVMe driver, allocate a shared data buffer (if the command uses a buffer), and send the command to a submission queue (SQ). Optionally, the current queue depth (QD) can be increased in order to manage all the free NVMe command slots.

3. The NVMe command is completed (e.g., a write or read is performed at the target medium) and an NVMe response (e.g., RSP, 16 bytes) is provided in the completion queue (CQ). A system can map the NVMe response to the NVMe command. If it is read related data, then the data will be put in the allocated shared buffer associated with the NVMe command.

4. An NVMe response and data (for a read) can be encapsulated according to a transport layer response definition and sent to the host (initiator).

Figure 2:
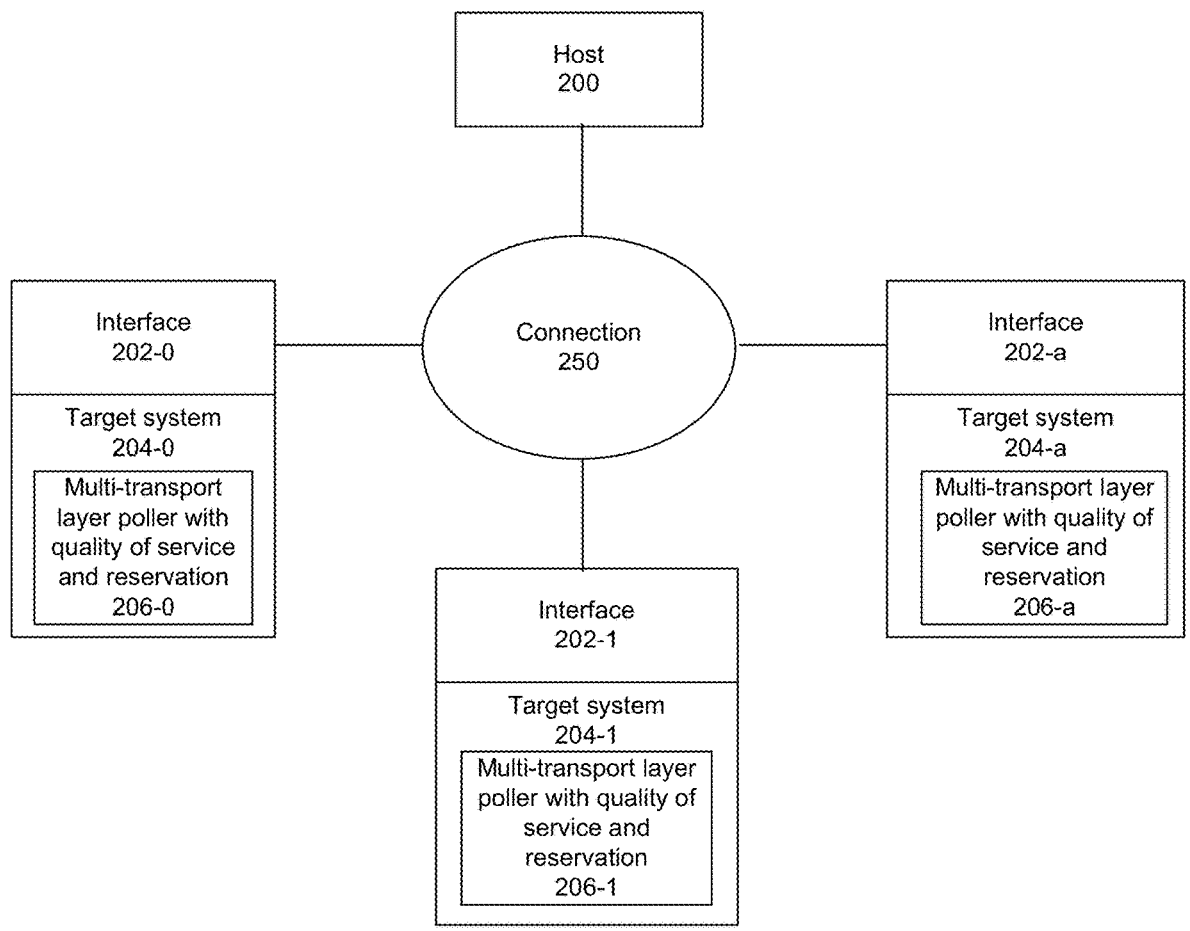
FIG. 2 depicts an example of a system in which a host can communicate with one or more storage devices using a connection.

FIG. 2 depicts an example of a system in which a host can communicate with one or more storage devices using a connection. A host or initiator 200 may communicate with one or more target subsystems 204-0 to 204-a, where a is an integer greater than or equal to 2. For example, a host or initiator 200 can execute a virtual machine or container with operating system and applications. An NVMe-oF host or initiator 200 can discover NVMe-oF storage transactions are available using one or more transport protocols. Transport protocol selection or switching can be provided at least for connection reliability or to reduce latency of storage transactions with a remote storage or memory device or pool. For example, according to its own applied policy, if a connection is broken or too slow (e.g., unacceptable latency) with an NVMe subsystem, a host or initiator 200 will connect with a target via another transport layer with its own configured order. For example, RDMA can be a default protocol, followed by FC, and the TCP although another order of transport layer selection can be used. A NVMe subsystem is defined in NVMe specification.

An NVMe subsystem can be registered on different transports together with different transport IP addresses and service IDs (e.g., port). Accordingly, users (e.g., applications, virtual machines, containers) can access an NVMe subsystem via different transports. Accordingly, if a single transport fails or is too slow, another transport can be used for the NVMe subsystem because at least two transports are configured for one subsystem.

Non-RDMA compliant NICs at host 200 and any interface 202-0 to 202-a can be used to support some embodiments. In some cases, for NVMe-oF using TCP transport, offloading TCP operations to a network interface can be utilized.

Target systems 204-0 to 204-a can use respective multi-transport layer poller with quality of service and reservation systems 206-0 to 206-a that poll for receipt of commands over multiple transport protocols according to a quality of service scheme and applies applicable reservation schemes described herein. Target systems 204-0 to 204-a can include at least an NVMe compatible subsystem with one or more controllers to manage read/write requests to namespace identifiers (NSID) defining ranges of addresses in the connected storage devices (e.g., solid state drives (SSDs)). The NVMe subsystem may communicate with the attached storage devices using a PCIe bus.

Connection 250 can be a network, interconnect, fabric, PCIe interface, bus or other wired or wireless medium.

Figure 3:
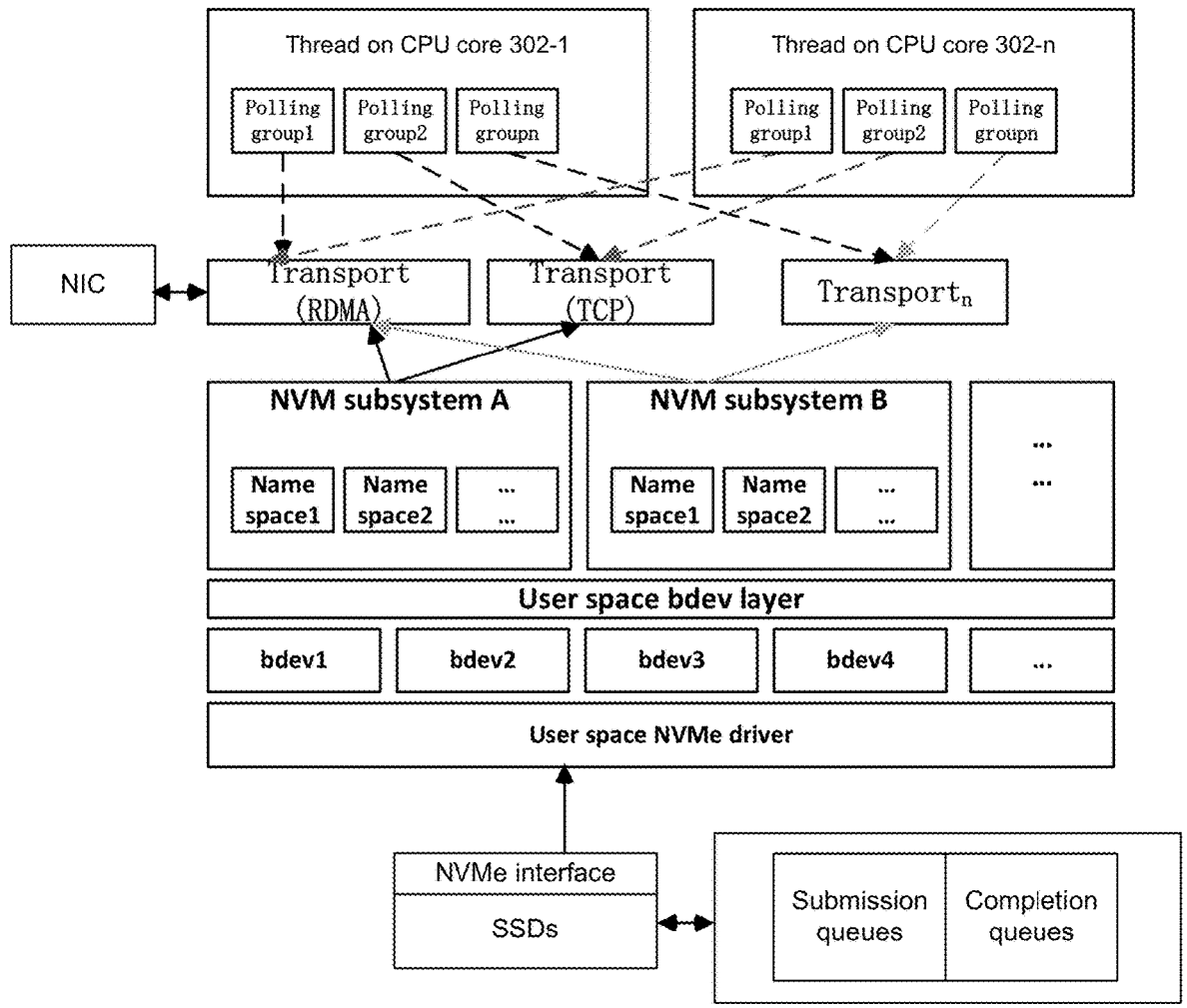
FIG. 3 depicts an example of NVMe-oF service design with TCP and RDMA transport enabled in NVMe compatible SSDs.

FIG. 3 depicts an example of NVMe-oF service design with TCP and RDMA transport enabled in NVMe compatible SSDs. An initiator (not shown) can use an NVMe discovery service with the target to determine multiple transport layers are supported with the target. In this example, a NVMe-oF target supports both RDMA and TCP transports, but each transport works independently. In some examples, the target can utilize features of Storage Performance Development Kit (SPDK) in connection with support of NVMe-oF. In the system of FIG. 3, there is a corresponding polling group executed on a central processing unit (CPU) core 302-1 to 302-n for each transport type. A polling group is periodically executed to search for received commands on its transport type. For example, if there are two transports, e.g., RDMA and TCP transport, there are independent two polling groups running on different CPU cores 302-1 to 302-n. Each transport has its own resource management (e.g., memory resource) and balancing memory management between the transport types may not be performed.

Each CPU core 302-1 to 302-n can run a dedicated thread for a polling group to monitor port for a transport type and maintain data buffer pool which is used for handling received NVMe commands. A polling group can be allocated for each transport protocol layer type to poll for received commands or completed transactions. But this scheme provides no priority among transports and quality of service (QoS) is not supported among transport types. If there is a failure of transport, there may not be a policy to handle failure of transport. For example, if RDMA transport fails or experiences high latency, no post actions are provided to resume an NVMe-oF connection on a different transport as the transports are independently handled.

In some cases, commands and data received using a transport protocol layer are allocated to a dedicated buffer pool. If an NVMe subsystem is exported through multiple transports, there may be no reservations support to prevent resource contention for simultaneous access to a memory buffer that stores communications or data received from a host or other device or to be provided to a host or other device. In addition, because there are multiple transports that access an NVMe subsystem, there can be contention among requests via transports at an NVMe subsystem such that different requests can request inconsistent actions (e.g., different write operations).

Virtual memory space of a processor is divided into kernel space and user space. The code of applications run in user space. If an application requests a kernel to perform a high privileged service, the application makes a system call to the kernel space. If the NVMe driver functionality is implemented in a Linux kernel, then for a user space application to read/operate on an NVMe device, the application issues a system call to the kernel, which introduces delay from context switch between kernel space and user space and data copy. If an NVMe-oF target service is in kernel space, various issues can arise. For example, (1) there is long I/O stack for the NVMe command execution in the kernel I/O stack with lots of locks and resource contention among multiple threads or (2) if the users (e.g., cloud storage providers) use such NVMe-oF service, they need upgrade their kernels or backport the NVMe-oF related new features into kernel (e.g., nvmet_tcp module to support TCP transport in the target side).

Various embodiments provide at least some supported transports into a single user space service. Various embodiments provide a user space solution to enable the NVMe-oF service via different transports using a polling group. For example, NVMe commands can be provided over one of different transports (e.g., remote direct memory access (RDMA), transmission control protocol (TCP), Fibre Channel (FC), InfiniBand, User Data Protocol (UDP), quick UDP Internet Connections (QUIC), and so forth). Various embodiments can provide a reliable service whereby an NVMe subsystem service is provided to hosts via different transports and if one transport fails or is deemed too slow, the client can switch to another transport. Various embodiments provide uniformed transport management with fine-grained transport resource management and scheduling to provide quality of service (QoS) from different transports.

Various embodiments provide a single polling group for NVMe-oF transactions for all (or a subset of) available or utilized transports. A threading model can be used to execute a single uniform polling group on one or multiple cores or processors. The polling group can poll among transports in a round robin way. Moreover, quality of service (QoS) can be applied to schedule polling of a transport according to a priority. A QoS policy for handling different transports can be set through a configuration file or using a remote procedure call (RPC) to dynamically change the QoS policy during the running of NVMe-oF target service. Compared with a solution of a transport having its own polling group, using a single polling group on one or more cores can be more balance the NVMe commands coming from different transports and simplify the resource management by use of a shared buffer pool instead of a pool for different transports.

Figure 4A:
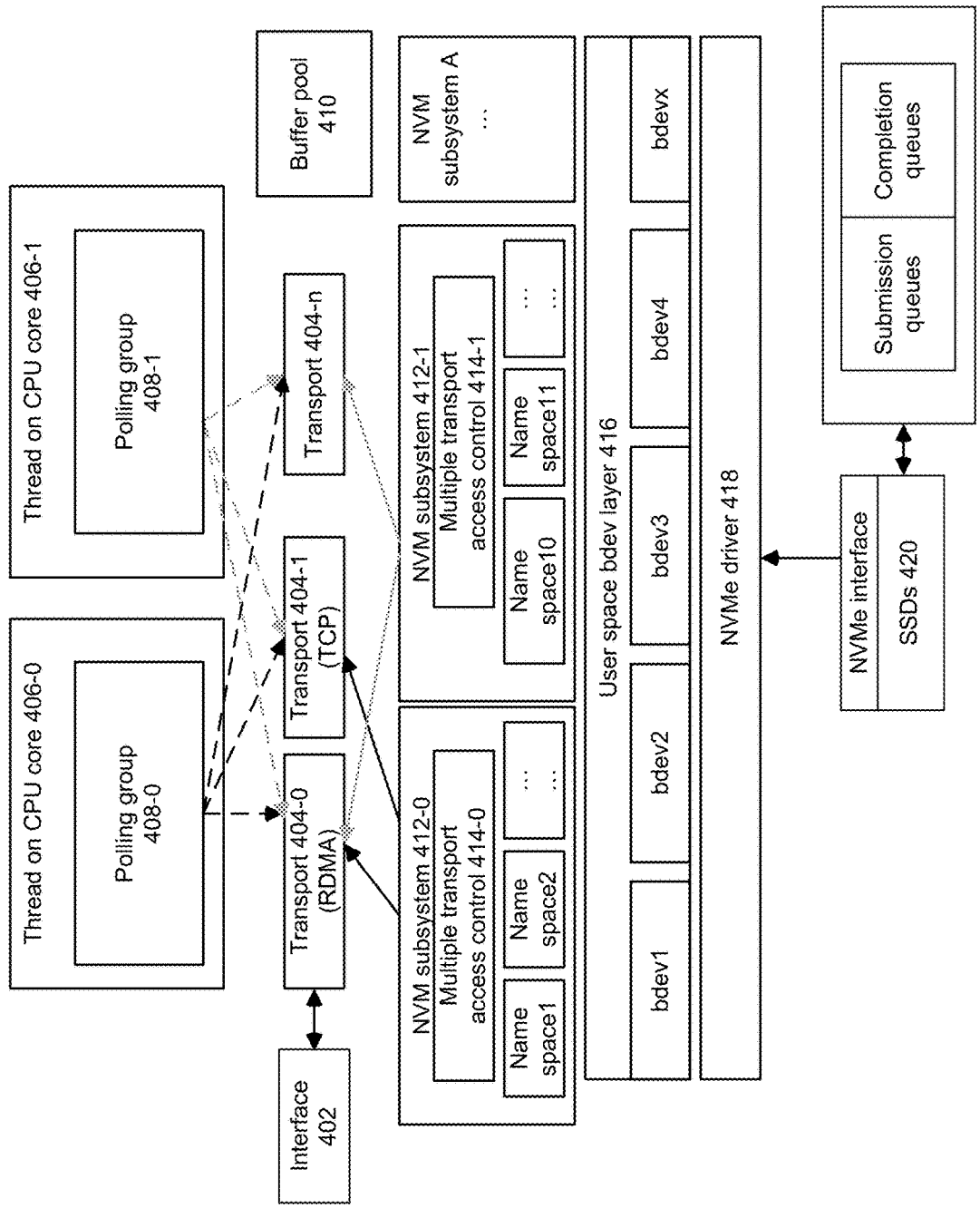
FIG. 4A depicts an example node to provide reliability for connection with an NVMe-oF service via different transports.

FIG. 4A depicts an example node to provide for connection with an NVMe-oF service via different transports. The node can be used in an NVMe cluster of one or more NVMe compatible storage devices. For example, the node can use interface 402 for communication with an initiator device via a network, interconnect, fabric, interconnect or other communication path. Packets received from interface 402 can be processed by an applicable transport layer processor 404-0 to **404-*n*. Transport layer processor 404-0 to 404-*n*** can perform transport layer processing for RDMA, TCP, FC, or other transports layers including User Data Protocol (UDP), QUIC, and so forth. Transport layer processing can be performed in kernel space using privileged operations or protected memory regions. Kernel space can be a memory area reserved for by a privileged operating system kernel, kernel extensions, and some device drivers. User space can be a memory area where application software and some drivers execute and write or read content.

Shared memory buffer pool 410 can be used for commands or packets received from an initiator over various transports. However, various embodiments can provide for a buffer for one or more transports. Multiple CPU cores 406-0 to 406-1 can share access to a buffer pool 410. For example, at the start of a polling group thread, a data buffer pool (e.g., 64 buffers) can be preallocated in buffer pool 410. For example, if there is an NVMe command extracted from the transport with a read type, a buffer can be allocated in pool 410. For an NVMe read command provided to an NVMe driver 418, the address of the allocated buffer is encapsulated in the NVMe command and after the read operation, the data read from the NVMe device can be copied to buffer in pool 410.

A thread on a CPU core can execute a polling group of communications using multiple transports received from an initiator. For example, a thread on CPU core 406-0 can execute polling group 408-0 to poll for receipt of packets processed by any of transport layer processors 404-0 to **404-*n*. When a connection through a transport is accepted, a selection scheme (e.g., round robin) can be used to dispatch the connection handling to a specified thread/CPU core to handle to add the connection to a polling group on the specified thread/CPU core. The polling group on a thread/CPU core is used to poll for commands from one or more connections in the polling group. A polling group can be associated with one or multiple connections and connections can be formed with one initiator or different initiators. Other CPU cores can be used to execute a polling group that polls for receipt of packets processed by any of transport layer processors 404-0 to 404-*n*. In this example, thread on CPU core 406-1 can execute polling group 408-1 to poll for receipt of packets processed by any of transport layer processors 404-0 to 404-*n* but any other number of cores or threads can be used. In some examples, polling group 408-0 and 408-1** can be implemented in user space.

For example, a polling group can perform reading of a register or memory space to determine if a new I/O transaction is available to process. If a new I/O transaction is available to process, the polling group can complete a descriptor for the I/O transaction and process new I/O transactions and then inform the I/O submitter (e.g., upper layer application) from VM of the completion status of the I/O transaction. A polling group can process the I/O transaction by performing protocol handling, buffer management, or interact with the hardware device. Performing protocol handling can include extracting a command type of an NVMe command and preparing the I/O request from the Ethernet package. Buffer management can include preparing a buffer for an NVMe SSD device and also a data buffer for packet receipt from an Ethernet NIC device. Interaction with the storage or network device can include sending I/O request to the NVMe SSD, the NVMe-oF remote device, or network device.

A polling group can apply priority of polling across different transport layer processors 404-0 to **404-*n*** according to an applicable quality of service (QoS). For example, applied QoS can include use of a polling group to poll for NVMe commands from different transports at a polling rate based on a minimum or maximum Input/Output Operations Per Second (IOPs) or minimum or maximum bandwidth for at least some transport layers. QoS can also involve a minimum or maximum number of NVMe command executions for each transport layer type according to a priority. Other QoS schemes can be used at least based on transport layer used to convey a storage command.

NVM subsystem 412-0 and 412-1 can be allocated for use over a range of namespaces. Other numbers of NVM subsystems can be used. In some examples, the range of namespaces managed by an NVM subsystem are non-overlapping. NVM subsystem 412-0 and 412-1 can apply different rules for different namespaces. NVM subsystem 412-0 and 412-1 can decapsulate NVMe commands and apply access control. For example, NVM subsystem 412-0 and 412-1 can use respective multiple transport access control 414-0 and 414-1 to prevent conflicts arising out of transactions sent over different transport layers. For example, access control can avoid read/write conflicts among different NVMe commands through different transports. Multiple transport access control 414-0 and 414-1 can be configured using, for example, an NVMe Reservation Register command (e.g., Section 6.11 in NVMe specification Revision 1.3c (2018)). The Reservation Register command is used to register, unregister, or replace a reservation key. Reservation Register commands can be associated with namespaces. Multiple transport access control 414-0 and 414-1 can manage restrictions from one transport protocol being applied to another transport protocol for the same connection or initiator. An initiator client server or virtual machine (VM) has its own host identifier, as defined in the NVMe specification.

For example, if an initiator uses a Reservation Register command to reserve an area of storage and uses RDMA transport layer to write the area. If a TCP transport layer is used to write to the area, the TCP transport layer inherits restrictions applied in the RDMA transport layer if the RDMA transport is disrupted, disconnected, or changed and commands transmitted using the TCP transport layer are subject to the restrictions. The restrictions can be, for example, preventing reads from a region or preventing write operations to the region. Other examples include mitigating contention among requests via different transports such that different requests can request inconsistent actions (e.g., different write operations) can be resolved according to a policy.

For example, if an initiator uses a Reservation Register command to reserve an area of storage and uses RDMA transport layer to write the area. The privilege and access role will be same for other transports (e.g., TCP transport), since the target identifies different hosts via 128 bit "Host identifier" defined in the NVMe specification. A connection through different transports from the same host using the same host identifier are subject to the same privileges. If an RDMA transport is disrupted or disconnected and the same host uses TCP transport layer to write to a storage region, the TCP transport layer inherits restrictions applied in the RDMA transport layer, and the commands transmitted using the TCP transport layer are subject to the same restrictions.

The restrictions can be, for example, preventing reads from a defined region (e.g., name space 1 in a subsystem) from another hosts or preventing write operations to the region from other hosts. Restrictions can mitigate contention among requests via different transports from different hosts such that where different requests would cause inconsistent actions (e.g., different write operations), the actions can be resolved according to a policy no matter which transport is used by a host.

Another example can be, there are two hosts A and B and A and B access the same name space 2 in subsystem C from the target. In this scenario, host A is "Holder" of namespace #2, and host B is "Registrant," host A sets the access type to "Write Exclusive" and host B can only read this name space until A releases the registration or changes the access type. If host A is using RDMA transport, host B is using FC transport and host A changes to use TCP transport, host A is still the "Holder" of a namespace #2 and manages the access privilege for other roles and the read/write policy is still controlled by its role until host A unregisters the reservation. Host B cannot write to namespace #2 whatever transport B is using.

In some examples, multiple transport access control 414-0 and 414-1 can control a polling rate of a polling group for communications sent through each transport based on a QoS or a pre-negotiated service level agreement (SLA). A multiple transport access control can pick a transport or polling rate to use to meet the QoS or SLA requirements.

Multiple transport access control 414-0 and 414-1 in a NVMe or NVMe-oF subsystem routes different commands (e.g., read or write) from a client or virtual machine or container to a different namespace. Multiple transport access control 414-0 and 414-1 can operate in user space.

NVM subsystem 412-0 and 412-1 can cause a received NVMe command to be converted to a block IO command. User space block device (bdev) layer 416 can divide NVMe SSDs into several paths or partitions. User space block device can be an SPDK bdev layer. In this example, block devices bdev1-bdevx can represent block device 1-x, although more or fewer block devices can be represented. User space bdev layer 416 can translate an NVMe command into a block command. User space bdev layer 416 can transform an address of an NVMe command (including virtual address) to a block layer command compatible with address accesses at the storage device. For example, a logical block layer address can be determined for an address. For example, bdev1 can correspond to logical block address lba0 to lba100 and a block size can be 4 KB or any size. Instead of bdev, asynchronous IO (AIO) manner can be used.

An SPDK block device layer is a library intended to be equivalent to the operating system block storage layer. The library can provide the following functionality: (1) a pluggable module API for implementing block devices that interface with different types of block storage devices; (2) driver modules for NVMe, malloc (ramdisk), Linux AIO, virtio-scsi, Ceph RBD, Pmem and Vhost-SCSI Initiator and more; (3) an application API for enumerating and claiming SPDK block devices and then performing operations (read, write, unmap, etc.) on those devices; (4) facilities to stack block devices to create complex I/O pipelines, including logical volume management (lvol) and partition support (GPT); (5) configuration of block devices via JSON-RPC; (6) request queueing, timeout, and reset handling; or (7) multiple, lockless queues for sending I/O to block devices.

NVMe driver 418 can execute in a kernel module such as user space 10 (UIO) or VFIO (Virtual function I/O) or in user space. NVMe driver 418 can issue NVMe commands to an associated NVMe compatible SSD or other storage or memory device. An NVMe command can be executed through queue pair (qpair). A queue pair can include a submission queue (SQ) and a completion queue (CQ). The command is put in the SQ, and CQ is used to receive response from SSDs 420.

Although examples described herein are with respect to host computing systems, various embodiments can be used in processors in a network or fabric interface. Cloud service providers or data center owners or renters can use techniques described herein across one or multiple network interfaces to configure data centers to poll for receipt of receipt of commands received via one or more transport layer protocols or poll for completion of commands using a poller that executes on a processor. Examples described herein can apply to memory or storage pools, including persistent memory.

Figure 4B:
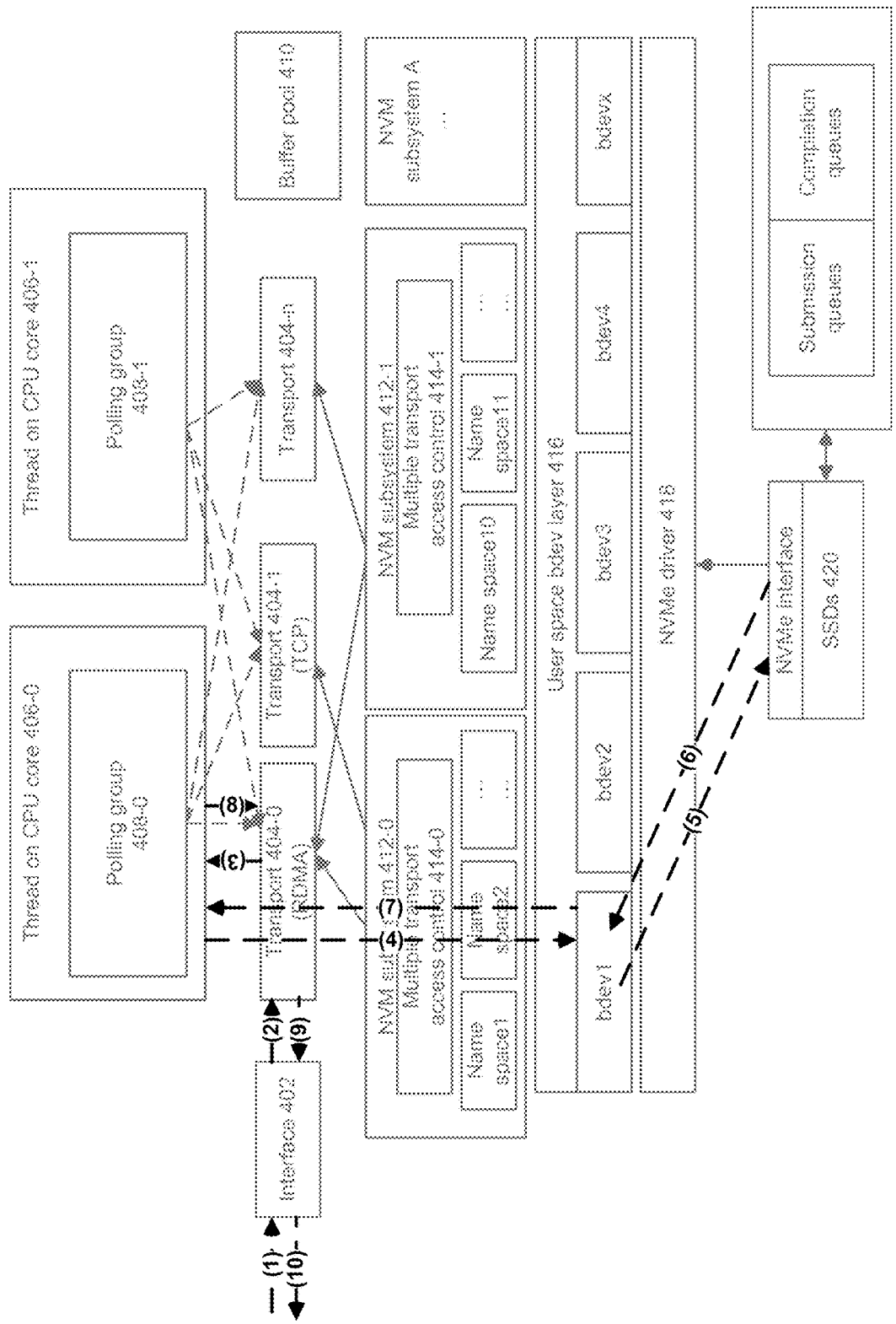
FIG. 4B depicts an example operation of the system of FIG. 4A.

FIG. 4B depicts an example operation of the system of FIG. 4A. An example processing flow can be as follows. At (1), interface 402 receives a packet. At (2), a transport layer processor processes the packet. At (3), based on polling by polling group 408-0 among different transport layers, the received packet is identified from use of RDMA and transport layer processor 404-0 processes the received packet and extracts an NVMe command. Transport layer processor 404-0 can allocate a buffer in shared buffer 410 (e.g., as needed by the NVMe command) to store the data associated with the received command from the initiator, or the buffer is used to put the contents to be read from the NVMe SSD identified by the command. At (4), NVM subsystem 412-0 receives the NVMe command and converts an address associated with the command to a block IO command using user space bdev layer 416 or using passthrough mode if an NVMe SSD can interpret the address. At (5), a block IO command is provided to NVMe interface of SSDs 420. At (6) and (7), after a storage transaction conveyed by the NVMe command is carried out, NVMe IO completion indication is provided to NVM subsystem 412-0 to complete the IO and notify the polling group (e.g., polling group 408-0). At (8) using a selected transport layer, a result is encapsulated and sent to the initiator. For example, for a read request, read data is encapsulated using a transport layer and at (9) a data packet is provided to interface 402 for transmission. At (10), interface 402 sends a data packet to the initiator system.

Figure 5:
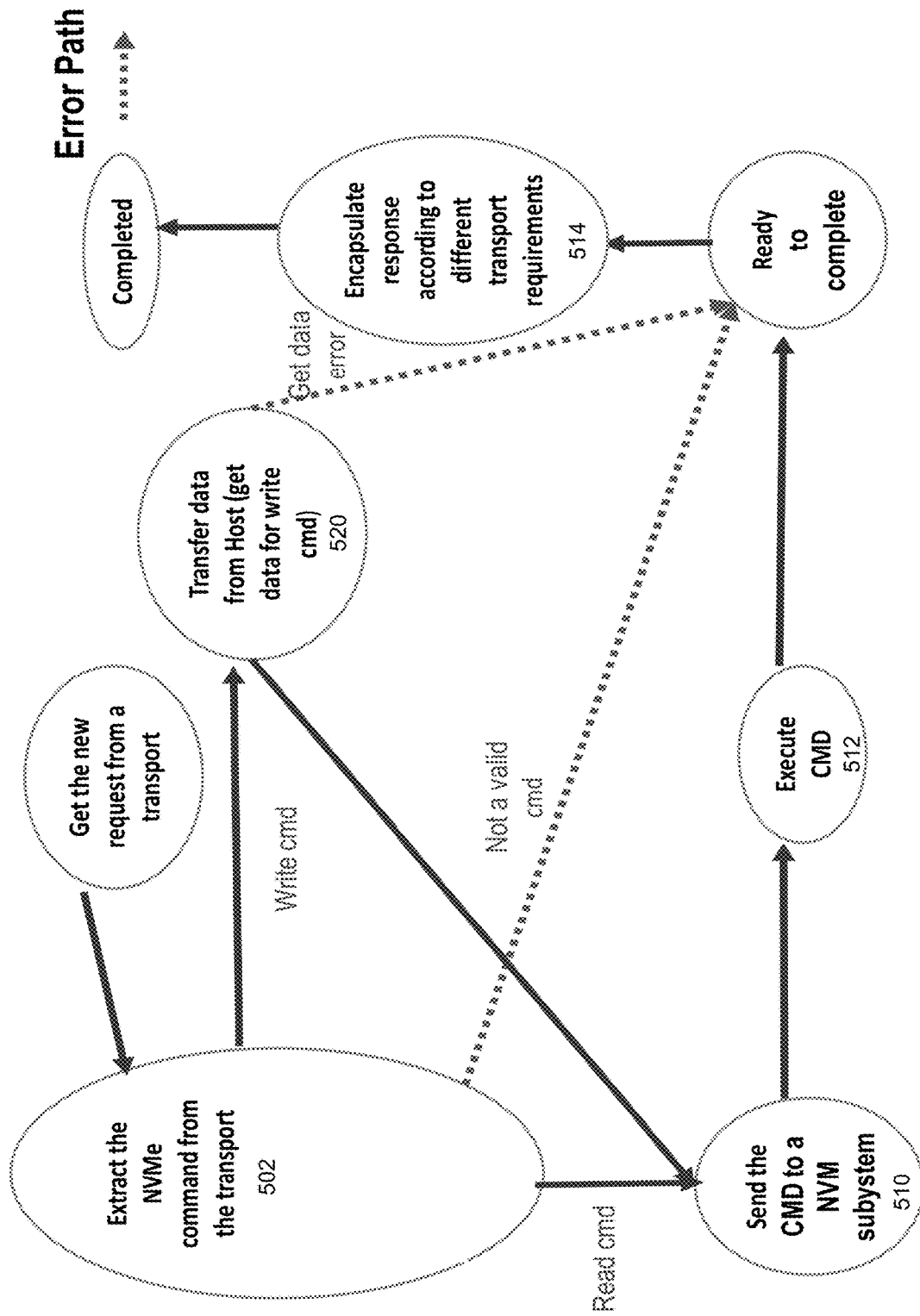
FIG. 5 shows a diagram for a transport layer processing.

FIG. 5 shows a diagram for a transport layer processing. When an NVMe command is received through a transport layer from a remote device, processing is described with respect to FIG. 5. A target receives a new request from a particular transport layer. At 502, the target extracts the NVMe command from the transport (e.g., NVMe command can be encapsulated in TCP PDU (Protocol Data Unit) for TCP transport). For a read command (CMD), at 510, the CMD can be sent to an NVM subsystem, and executed (512), and an encapsulated response provided (514) according to transport requirements. For a write command (CMD), at 520, data from the host from write CMD is accessed and the process from 510, 512, and 514 occur.

Figure 6A:
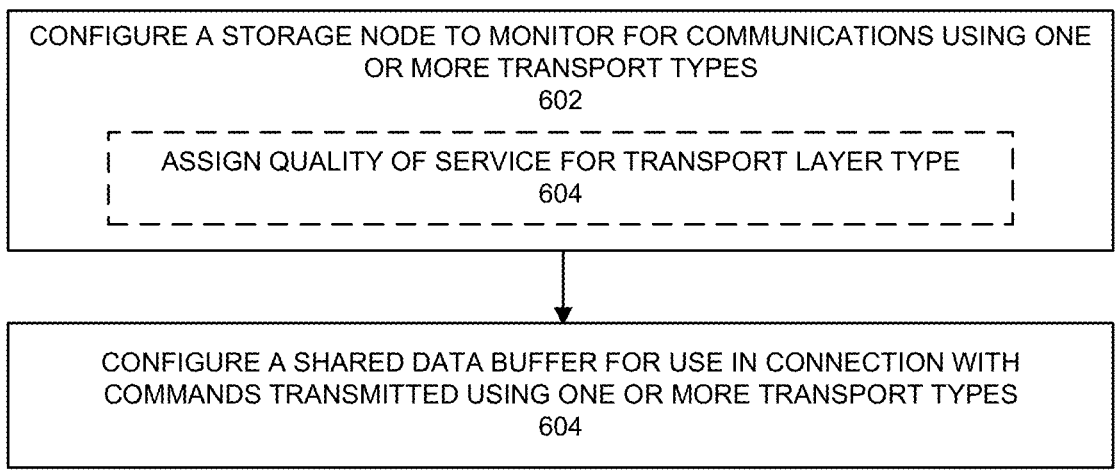
FIG. 6A depicts an example process to configure a target storage node for communication using one or multiple transport types.

FIG. 6A depicts an example process to configure a target storage node for communication using one or multiple transport types. At 602, the process configures a polling group of transactions received using one or more transport types between a host and a node. The polling group can be executed by a single core (or multiple cores) to poll from among multiple transport types for received communications from a connection. In addition, the polling group can also poll for received completion notifications indicating completion of a read or write operation provided by the storage device(s). For example, a target storage node can receive and perform NVMe commands using NVMe-oF compatible communications. Various transport layer types for NVMe commands can be used such as one or more of: remote direct memory access (RDMA), transmission control protocol (TCP), Fibre Channel (FC), InfiniBand, User Data Protocol (UDP), QUIC, and so forth. In some examples, a single core can execute a polling group for transactions received using one or more transport types between a host and a node.

In addition, at 602, priority of polling for a transport type can be set whereby polling of a first transport layer type can occur at a first rate and polling of a second transport layer type can occur at a second rate. The first and second rates can be set to provide a quality of service for different transport layer types to potentially prioritize polling of communications of one type of transport layer over another type of transport layer.

At 604, the process can configure a shared data buffer to store received commands and related content from one or more transport types. The shared data buffer can be allocated for commands from one or more transport types from an initiator or a connection. The shared data buffer can be accessed by one or multiple polling groups without locking if a polling group accesses the data buffer (e.g., read or write). The shared data buffer can be allocated to store data associated with the NVMe command of read type or write type. For example, for a write NVMe command, data associated with an NVMe command can be stored in the shared buffer. For a read NVMe command, data read from a storage medium and associated with an NVMe read command can be stored in the shared buffer prior to transmission to an initiator.

Figure 6B:
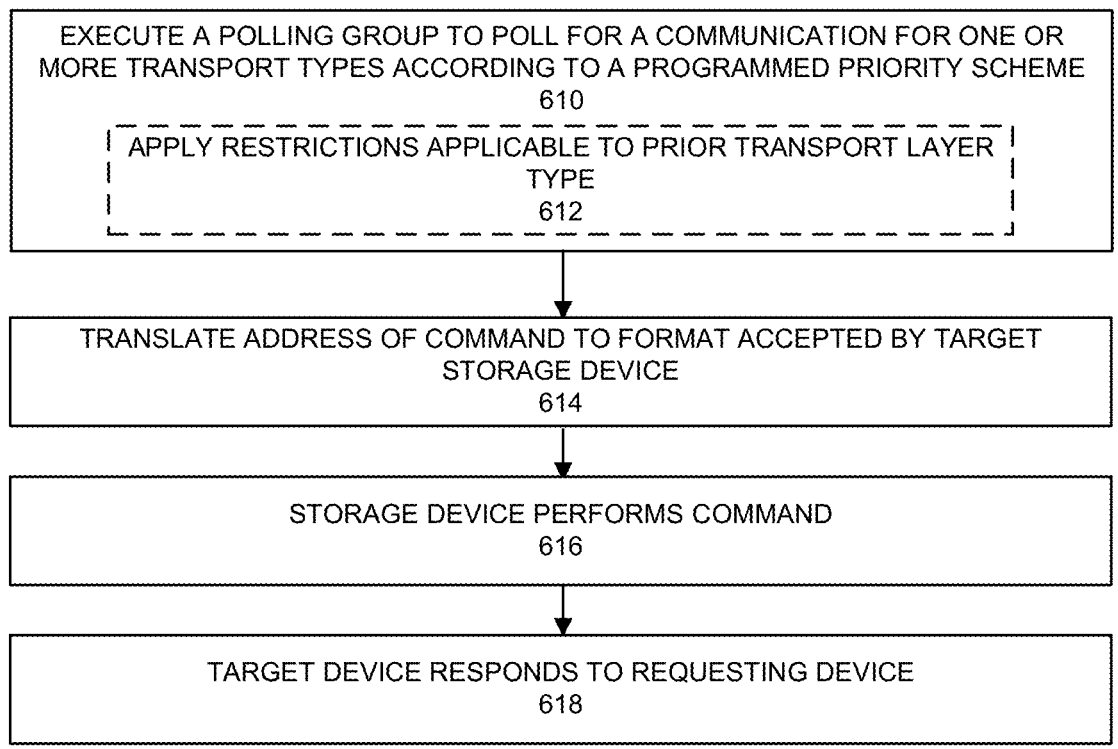
FIG. 6B depicts an example process that can be used by a node for communications with another node or host device.

FIG. 6B depicts an example process that can be used by a node for communications with another node or host device. At 610, the process uses a polling group to poll for a storage-related command communication using one or more transport types according to a programmed priority scheme. At 610, the polling group can poll for submission of a command (e.g., NVMe command) or completion of the command (e.g., data is available in connection with a read command or data has been written for a write command). The rate of polling for a transport layer can be configured. A shared buffer pool allocated for the polling group can used to store data associated with the NVMe command. For a write command, data can be data to be written to a storage medium. For a read command, data can be data read from the storage medium.

At 612, in an event that restrictions are applicable to a first transport protocol, the restrictions can be applied to a second transport protocol used for conveying NVMe commands. For example, if a region is subject to a restriction on preventing read or write operation for the first transport protocol, the restriction is propagated to use of the second transport protocol. Various examples of restrictions and reservations are described herein.

At 614, in response to detection of a communication for a transport type, the process translates an address associated with the command (e.g., NVMe command) into an address or address range used by a target storage device for the address associated with the command. For example, the user space block device can translate an address to an address on the physical storage device.

At 616, the storage device carries out the command and notifies the polling group of completion of the command. If the command is for a data read, the data is stored in a shared buffer and available to be transmitted. At 618, a result of the storage command is provided to the initiator using a selected transport layer. For example, one of multiple transport layers can be selected for use to send a response to the storage command. In a case where data is read from the storage device, the data can be transmitted to the requester. In a case where data is to be written to the storage device, a completion notification can be sent to the requester. A response can be fetched through the CQ (completion queue).

Figure 7:
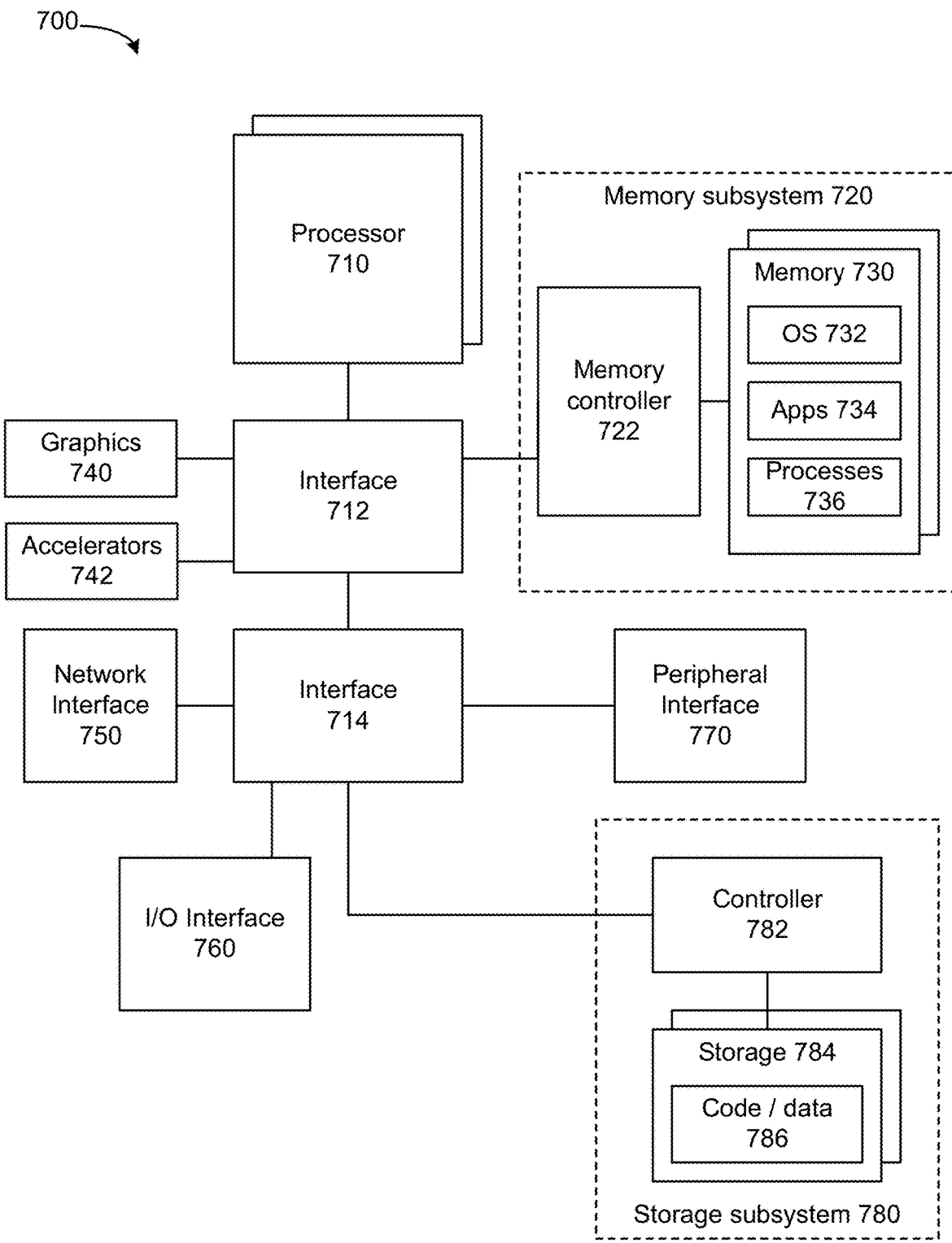
FIG. 7 depicts a system.

FIG. 7 depicts a system. The system can use embodiments described herein to poll for received packets over multiple transport layer protocols with a poller executing on one or more processors. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function or programmable offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 742 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include stand-alone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can receive data from a remote device, which can include storing received data into memory. Various embodiments can be used in connection with network interface 750, processor 710, and memory subsystem 720. Various embodiments of network interface 750 use embodiments described herein to receive or transmit timing related signals and provide protection against circuit damage from misconfigured port use while providing acceptable propagation delay.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a non-volatile manner, such as one or more magnetic, solid state, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as: Ethernet (IEEE 802.3), remote direct memory access (RDMA), InfiniB and, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Figure 8:
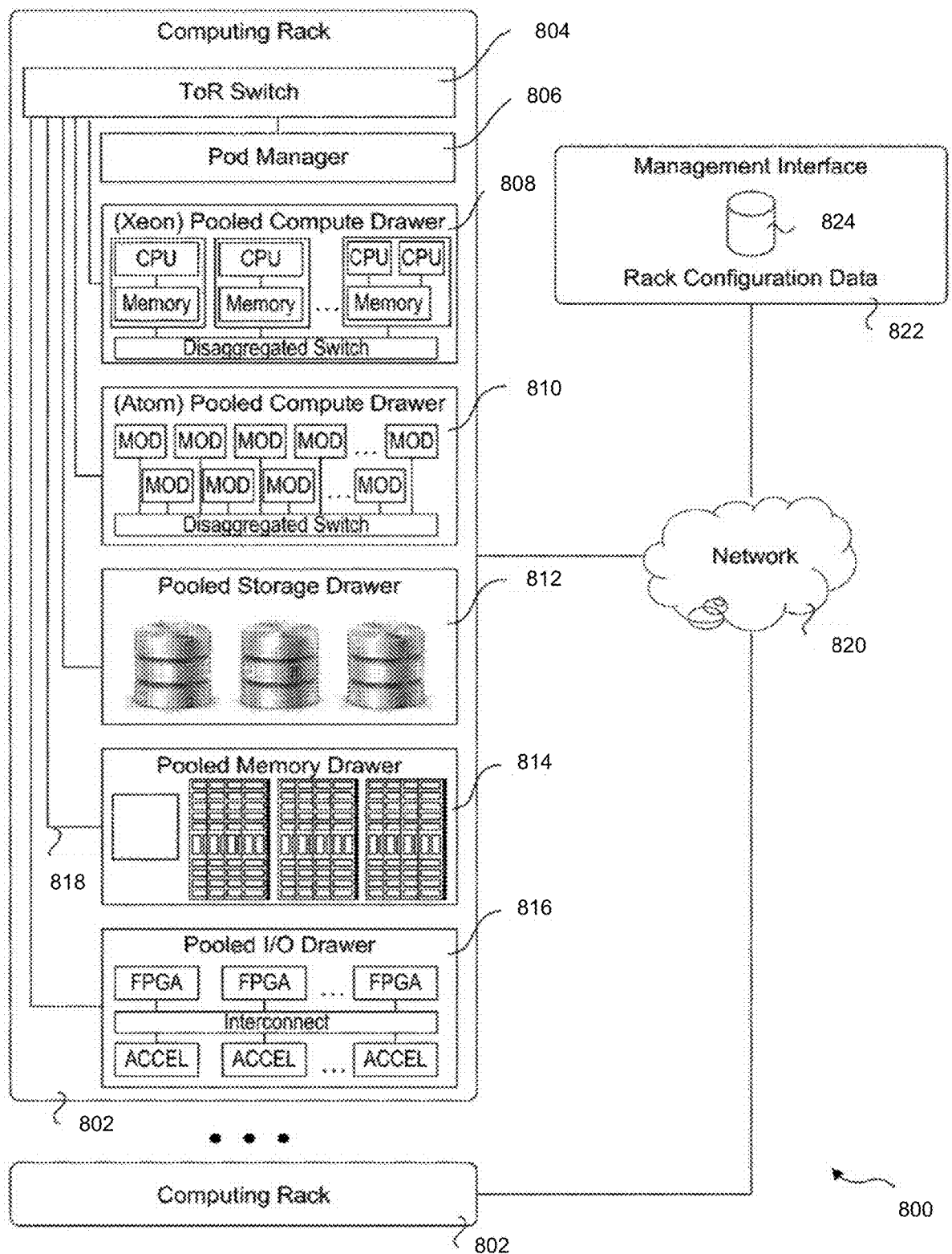
FIG. 8 depicts an environment.

FIG. 8 depicts an environment 800 includes multiple computing racks 802, each including a Top of Rack (ToR) switch 804, a pod manager 806, and a plurality of pooled system drawers. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® Xeon® processor pooled computer drawer 808, and Intel® ATOM™ processor pooled compute drawer 810, a pooled storage drawer 812, a pooled memory drawer 814, and a pooled I/O drawer 816. Each of the pooled system drawers is connected to ToR switch 804 via a high-speed link 818, such as a 40 Gigabit/second (Gb/s) or 100 Gb/s Ethernet link or a 100+Gb/s Silicon Photonics (SiPh) optical link.

Multiple of the computing racks 802 may be interconnected via their ToR switches 804 (e.g., to a pod-level switch or data center switch), as illustrated by connections to a network 820. In some embodiments, groups of computing racks 802 are managed as separate pods via pod manager(s) 806. In one embodiment, a single pod manager is used to manage all of the racks in the pod. Alternatively, distributed pod managers may be used for pod management operations.

Environment 800 further includes a management interface 822 that is used to manage various aspects of the environment. This includes managing rack configuration, with corresponding parameters stored as rack configuration data 824.

In an example, environment 800 can be implemented using interconnected compute sleds of processors, memories, storages, network interfaces, and other components. High speed interconnects can be used such as: Ethernet (IEEE 802.3), remote direct memory access (RDMA), InfiniB and, Internet Wide Area RDMA Protocol (iWARP), quick User Datagram Protocol (UDP) Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Figure 9:
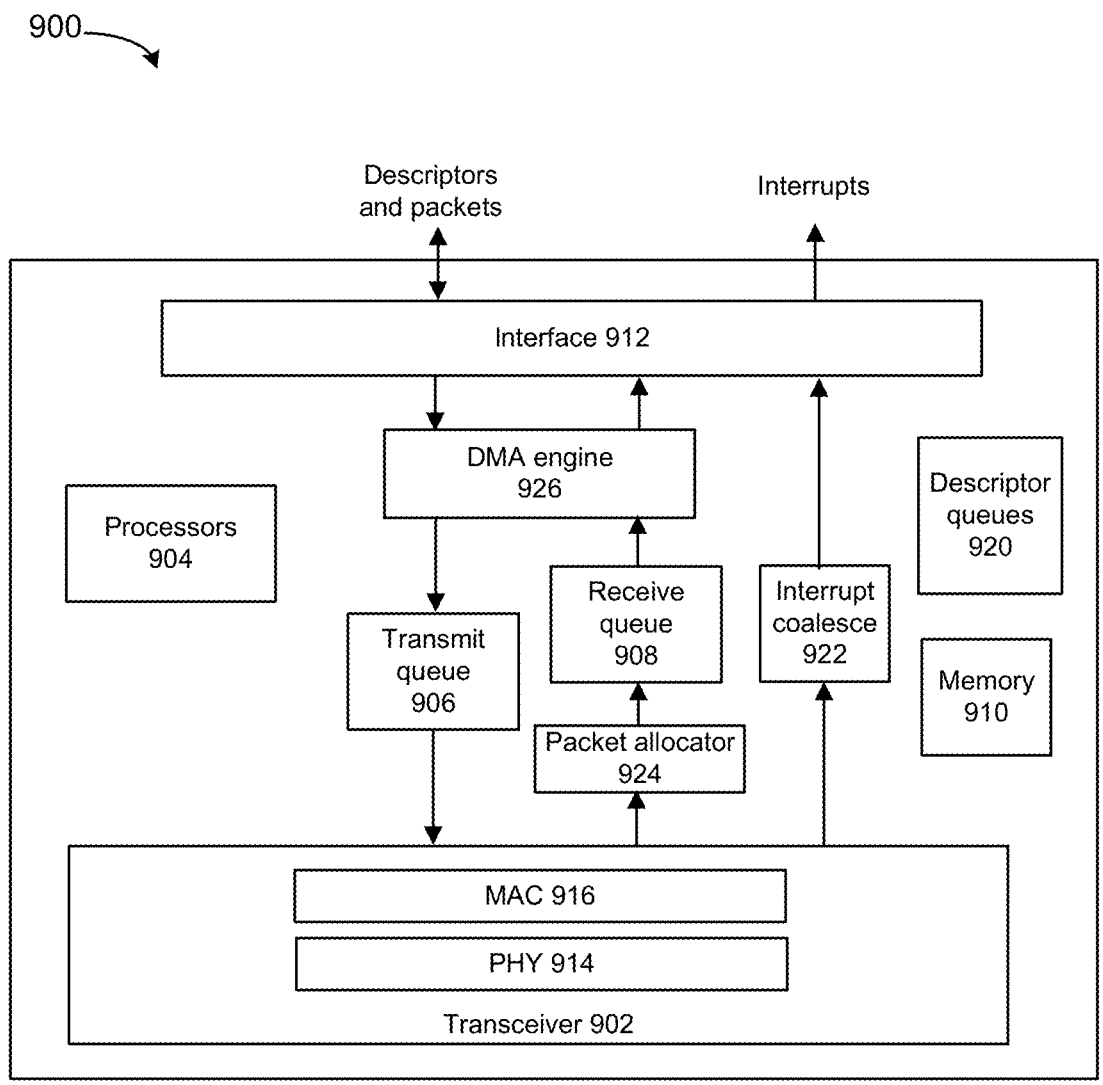
FIG. 9 depicts a network interface.

FIG. 9 depicts a network interface that can use embodiments or be used by embodiments. The network interface can use embodiments described herein in connection with various embodiments to receive or transmit packets. Network interface 900 can include transceiver 902, processors 904, transmit queue 906, receive queue 908, memory 910, and bus interface 912, and DMA engine 926. Transceiver 902 can be capable of receiving and transmitting packets in conformance with the applicable protocols such as Ethernet as described in IEEE 802.3, although other protocols may be used. Transceiver 902 can receive and transmit packets from and to a network via a network medium (not depicted). Transceiver 902 can include physical layer (PHY) circuitry 914 and media access control (MAC) circuitry 916. PHY circuitry 914 can include encoding and decoding circuitry (not shown) to encode and decode data packets according to applicable physical layer specifications or standards. MAC circuitry 916 can be configured to assemble data to be transmitted into packets, that include destination and source addresses along with network control information and error detection hash values. MAC circuitry 916 can be configured to process MAC headers of received packets by verifying data integrity, removing preambles and padding, and providing packet content for processing by higher layers.

Processors 904 can be any a combination of a: processor, core, graphics processing unit (GPU), field programmable gate array (FPGA), application specific integrated circuit (ASIC), or other programmable hardware device that allow programming of network interface 900. For example, processors 904 can provide for allocation or deallocation of intermediate queues. For example, a "smart network interface" can provide packet processing capabilities in the network interface using processors 904.

Packet allocator 924 can provide distribution of received packets for processing by multiple CPUs or cores using timeslot allocation described herein or RSS. When packet allocator 924 uses RSS, packet allocator 924 can calculate a hash or make another determination based on contents of a received packet to determine which CPU or core is to process a packet.

Interrupt coalesce 922 can perform interrupt moderation whereby network interface interrupt coalesce 922 waits for multiple packets to arrive, or for a time-out to expire, before generating an interrupt to host system to process received packet(s). Receive Segment Coalescing (RSC) can be performed by network interface 900 whereby portions of incoming packets are combined into segments of a packet. Network interface 900 provides this coalesced packet to an application.

Direct memory access (DMA) engine 926 can copy a packet header, packet payload, and/or descriptor directly from host memory to the network interface or vice versa, instead of copying the packet to an intermediate buffer at the host and then using another copy operation from the intermediate buffer to the destination buffer.

Memory 910 can be any type of volatile or non-volatile memory device and can store any queue or instructions used to program network interface 900. Transmit queue 906 can include data or references to data for transmission by network interface. Receive queue 908 can include data or references to data that was received by network interface from a network. Descriptor queues 920 can include descriptors that reference data or packets in transmit queue 906 or receive queue 908. Bus interface 912 can provide an interface with host device (not depicted). For example, bus interface 912 can be compatible with peripheral connect Peripheral Component Interconnect (PCI), PCI Express, PCI-x, Serial ATA (SATA), and/or Universal Serial Bus (USB) compatible interface (although other interconnection standards may be used).

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes a non-transitory computer-readable medium comprising instructions stored thereon, that if executed by one or more processors, cause the one or more processors to: execute a poller to: poll for received communications over multiple transport layer protocols from a connection to identify a received communication from one of the multiple transport layer protocols and identify a second received communication from a different one of the multiple transport layer protocols.

Example 2 can be combined with any example, wherein a received communication comprises a non-volatile memory express over fabrics (NVMe-oF) compatible command.

Example 3 can be combined with any example, wherein a change to the different one of the multiple transport layer protocols occurs in response to failure of the one of the multiple transport layer protocols or slow transport rate using the one of the multiple transport layer protocols.

Example 4 can be combined with any example, wherein the poller is executed in user space and comprising instructions stored thereon, that if executed by one or more processors, cause the one or more processors to perform transport layer protocol processing of the received communication and second received communication in kernel space.

Example 5 can be combined with any example, and comprising instructions stored thereon, that if executed by one or more processors, cause the one or more processors to: configure a quality of service applied by the poller to poll for communications received from among the multiple transport layer protocols.

Example 6 can be combined with any example, and comprising instructions stored thereon, that if executed by one or more processors, cause the one or more processors to: execute the poller to poll for completion indications from a storage device for executed commands, wherein the poller is to poll for completion indications based on a configured quality of service.

Example 7 can be combined with any example, wherein the transport layer protocols comprise one or more of: remote direct memory access (RDMA), transmission control protocol (TCP), Fibre Channel (FC), InfiniB and, User Data Protocol (UDP), or quick UDP Internet Connections (QUIC).

Example 8 can be combined with any example, and includes instructions stored thereon, that if executed by one or more processors, cause the one or more processors to: apply restrictions to a second transport layer protocol applied to a prior first transport layer protocol.

Example 9 can be combined with any example, and includes instructions stored thereon, that if executed by one or more processors, cause the one or more processors to: receive a response from a storage device and generate a packet with the response to an initiator using one of the multiple transport layer protocols.

Example 10 can be combined with any example, and includes a method for providing a non-volatile memory express over fabrics (NVMe-oF) compatible service using one or more of at least two different transport layer protocols, the method comprising: executing a poller to poll from among multiple different transport layer protocols for receipt of a storage command and causing protocol processing of a command received using a transport layer protocol and detected by the poller.

Example 11 can be combined with any example, and includes permitting simultaneous access to an NVMe compatible storage device using different transport layer protocols.

Example 12 can be combined with any example, wherein the poller is performed in a user space and the protocol processing is performed in kernel space.

Example 13 can be combined with any example, and wherein executing a poller to poll from among multiple different transport layers for receipt of a storage command applies a quality of service per transport layer type.

Example 14 can be combined with any example, and includes translating an address of a received command into a logical block address accessible at a storage device.

Example 15 can be combined with any example, and includes polling for a response to the received command and providing the response for transmission using a transport layer protocol.

Example 16 can be combined with any example, and includes receiving communication from an initiator that changes to use of a second transport layer protocol from use of a first transport layer protocol and applying restrictions to the second transport layer protocol applied to the first transport layer protocol.

Example 17 can be combined with any example, and wherein the transport layer protocols comprise one or more of: remote direct memory access (RDMA), transmission control protocol (TCP), Fibre Channel (FC), InfiniBand, User Data Protocol (UDP), or quick UDP Internet Connections (QUIC).

Example 18 can be combined with any example, and includes a system comprising: a network interface; a memory coupled to the network interface; and a first processor coupled to the memory, the first processor configured to: execute a first poller to poll for a received storage command received using a first and second transport protocols and a second processor coupled to the memory, the second processor configured to: execute a second poller to poll for a received storage command received using the first and second transport protocols.

Example 19 can be combined with any example, and wherein the first processor is to: apply a quality of service of the first poller to poll for a received storage command received using a first and second transport protocols and wherein the second processor is to: apply a quality of service of the second poller to poll for a received storage command received using a first and second transport protocols.

Example 20 can be combined with any example, and wherein the first processor is to: execute the first poller to poll for a completion of a storage command and cause a transmission of a response to a remote device using the first or second transport protocol and wherein the second processor is to: execute the second poller to poll for a completion of a storage command and cause a transmission of a response to a remote device using the first or second transport protocol.

Example 21 can be combined with any example, and wherein the transport protocols comprise one or more of: remote direct memory access (RDMA), transmission control protocol (TCP), Fibre Channel (FC), InfiniB and, User Data Protocol (UDP), or quick UDP Internet Connections (QUIC).

What is claimed is:

1. A non-transitory computer-readable medium comprising instructions stored thereon, that if executed by one or more processors, cause the one or more processors to:
   execute a poller to:
      poll for received communications over multiple transport layer protocols from a connection to identify a received communication from one of the multiple transport layer protocols and identify a second received communication from a different one of the multiple transport layer protocols.

2. The computer-readable medium of claim 1, wherein a received communication of the received communication comprises a non-volatile memory express over fabrics (NVMe-oF) compatible command.

3. The computer-readable medium of claim 1, wherein a change to the different one of the multiple transport layer protocols occurs in response to failure of the one of the multiple transport layer protocols or slow transport rate using the one of the multiple transport layer protocols.

4. The computer-readable medium of claim 1, wherein the poller is executed in user space and comprising instructions stored thereon, that if executed by the one or more processors, cause the one or more processors to perform transport layer protocol processing of the received communication and the second received communication in kernel space.

5. The computer-readable medium of claim 1, comprising instructions stored thereon, that if executed by one or more processors, cause the one or more processors to:
   configure a quality of service applied by the poller to poll for communications received from among the multiple transport layer protocols.

6. The computer-readable medium of claim 1, comprising instructions stored thereon, that if executed by one or more processors, cause the one or more processors to:
   execute the poller to poll for completion indications from a storage device for executed commands, wherein the poller is to poll for completion indications based on a configured quality of service.

7. The computer-readable medium of claim 1, wherein the multiple transport layer protocols comprise one or more of: remote direct memory access (RDMA), transmission control protocol (TCP), Fibre Channel (FC), InfiniBand, User Data Protocol (UDP), or quick UDP Internet Connections (QUIC).

8. The computer-readable medium of claim 1, comprising instructions stored thereon, that if executed by one or more processors, cause the one or more processors to:
apply restrictions to a second transport layer protocol of the multiple transport layer protocols applied to a prior first transport layer protocol of the multiple transport layer protocols.

9. The computer-readable medium of claim 1, comprising instructions stored thereon, that if executed by one or more processors, cause the one or more processors to:
receive a response from a storage device and
generate a packet with the response to an initiator using one of the multiple transport layer protocols.

10. A method for providing a non-volatile memory express over fabrics (NVMe-oF) compatible service using one or more of at least two different transport layer protocols, the method comprising:
executing a poller to poll from among multiple different transport layer protocols for receipt of a storage command and
causing protocol processing of a command received using a transport layer protocol of the multiple different transport layer protocols and detected by the poller.

11. The method of claim 10, comprising:
permitting simultaneous access to an NVMe compatible storage device using different transport layer protocols.

12. The method of claim 10, wherein the poller is performed in a user space and the protocol processing is performed in kernel space.

13. The method of claim 10, wherein executing a poller to poll from among multiple different transport layers for receipt of a storage command applies a quality of service per transport layer type.

14. The method of claim 10, comprising:
translating an address of a received command into a logical block address accessible at a storage device.

15. The method of claim 10, comprising:
polling for a response to the received command and
providing the response for transmission using a transport layer protocol of the multiple transport layer protocols.

16. The method of claim 10, comprising
receiving communication from an initiator that changes to use of a second transport layer protocol of the multiple transport layer protocols from use of a first transport layer protocol of the multiple transport layer protocols and
applying restrictions to the second transport layer protocol applied to the first transport layer protocol.

17. The method of claim 10, wherein the multiple transport layer protocols comprise one or more of: remote direct memory access (RDMA), transmission control protocol (TCP), Fibre Channel (FC), InfiniBand, User Data Protocol (UDP), or quick UDP Internet Connections (QUIC).

18. A system comprising:
a network interface;
a memory coupled to the network interface; and
a first processor coupled to the memory, the first processor configured to:
execute a first poller to poll for a received storage command received using a first and second transport protocols and
a second processor coupled to the memory, the second processor configured to:
execute a second poller to poll for a received storage command received using the first and second transport protocols.

19. The system of claim 18, wherein the first processor is to:
apply a quality of service of the first poller to poll for a received storage command received using the first and second transport protocols and
wherein the second processor is to:
apply a quality of service of the second poller to poll for a received storage command received using a first and second transport protocols.

20. The system of claim 18, wherein the first processor is to:
execute the first poller to poll for a completion of a storage command and
cause a transmission of a response to a remote device using the first or second transport protocol based on detection of completion of the storage command by the first poller and
wherein the second processor is to:
execute the second poller to poll for a completion of a storage command and cause a transmission of a response to a remote device using the first or second transport protocol based on detection of completion of the storage command by the second poller.

21. The system of claim 18, wherein the first and second transport protocols comprise one or more of: remote direct memory access (RDMA), transmission control protocol (TCP), Fibre Channel (FC), InfiniBand, User Data Protocol (UDP), or quick UDP Internet Connections (QUIC).

* * * * *